(12) United States Patent
Tsukihashi et al.

(10) Patent No.: US 6,728,802 B2
(45) Date of Patent: Apr. 27, 2004

(54) CONTROL METHOD OF OPTICAL DISK RECORDING/REPRODUCING APPARATUS

(75) Inventors: Akira Tsukihashi, Ohra-gun (JP); Katsuki Hattori, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 228 days.

(21) Appl. No.: 10/079,399

(22) Filed: Feb. 20, 2002

(65) Prior Publication Data

US 2002/0144022 A1 Oct. 3, 2002

(30) Foreign Application Priority Data

Apr. 2, 2001 (JP) ........................................ 2001-103426

(51) Int. Cl.[7] .............................. G06F 3/00; G06F 3/02; G06F 3/023; G06F 3/05; G06F 3/06
(52) U.S. Cl. ...................................................... 710/58
(58) Field of Search ........................ 710/22–24, 33–35, 710/48–61; 711/112; 369/30.23, 44 T, 47 T, 53 T

(56) References Cited

U.S. PATENT DOCUMENTS

| | | | | |
|---|---|---|---|---|
| 5,450,546 A | * | 9/1995 | Krakirian | 710/57 |
| 6,119,201 A | * | 9/2000 | Kulakowski et al. | 711/112 |
| 6,401,169 B1 | * | 6/2002 | McMurdie et al. | 711/112 |
| 6,405,283 B1 | * | 6/2002 | James | 711/112 |
| 6,532,504 B2 | * | 3/2003 | Hattori | 710/52 |
| 6,538,962 B2 | * | 3/2003 | Hyun | 369/30.23 |
| 6,570,832 B2 | * | 5/2003 | Yamamoto | 369/59.25 |

* cited by examiner

*Primary Examiner*—Christopher B. Shin
(74) *Attorney, Agent, or Firm*—Hogan & Hartson, LLP

(57) ABSTRACT

There is disclosed an optical disk recording/reproducing apparatus in which a recording operation is interrupted and resumed based on an amount of a signal stored in a buffer RAM for temporarily storing a recording signal. The operation is controlled by a host apparatus connected to an external peripheral apparatus via a data bus. Furthermore, when reset processing is performed by attachment/detachment of the optical disk recording/reproducing apparatus during the recording operation of the signal onto the disk, the host apparatus outputs a command signal for identifying the optical disk recording/reproducing apparatus.

20 Claims, 1 Drawing Sheet

CONTROL METHOD OF OPTICAL DISK RECORDING/REPRODUCING APPARATUS

BACKGROUND OF THE INVENTION i) Field of the Invention

The present invention relates to a disk recording/reproducing apparatus for recording of a signal on a disk by a pickup and for reproducing of a signal recorded on the disk.

ii) Description of Related Art

Optical disk players having an optical pickup for reading signals recorded on a disk have become common items, and in recent years optical disk recording/reproducing apparatuses having a constitution including, in addition to reproduction capability, a capability of recording a signal on a disk by emitting a light beam from a laser element incorporated in the optical pickup have also become commercially available.

Moreover, many such optical disk recording/reproducing apparatuses now available can be connected to a computer apparatus as a host apparatus, and the host apparatus in turn can usually be connected to many peripheral apparatuses via a data bus.

A typical such optical disk recording/reproducing apparatus records the signal in response to a recording command from a computer apparatus as a host apparatus. Such recording operation includes storing the signal to be recorded on the disk once in a buffer RAM, reading out the signal stored in the buffer RAM, modulating the signal, and supplying the signal to the laser element to record the signal onto the disk.

When the signal is normally recorded onto the disk, a writing operation of recording signal output from a computer apparatus into the buffer RAM, reading operation of the signal from the buffer RAM, and recording operation of the read signal onto the disk are carried out in accordance with the size of the recording signal or the situation or state of recording on the disk itself.

During the signal recording operation, when the amount of recording signal data stored in the buffer RAM becomes insufficient, signal recording onto the disk cannot continue, that is, a so-called buffer underrun state results. As a method for solving the problem, there is a known technique including steps of halting the recording operation onto the disk when the amount of the recording signal data stored in the buffer RAM falls below a predetermined value, which is an interruption setting value; and the resuming the recording operation onto the disk when the amount of the recording signal stored in the buffer RAM again exceeds a predetermined value, a resumption setting value.

Moreover, the host apparatus connected to the optical disk recording/reproducing apparatus, which may, as noted above, be additionally connected to a number of peripheral apparatuses via a data bus, may perform a reset operation when trouble occurs with one or more peripheral apparatus. When the signal output from the host apparatus constituted in this manner is being recorded onto the disk while such a reset operation is performed, not only is the recording operation interrupted, but also the signal as recorded on the disk is interrupted. When this occurs, all signals recorded on the disk usually become invalid.

SUMMARY OF THE INVENTION

An advantage of the present invention is to provide an optical disk recording/reproducing apparatus which can prevent problems from resulting due to resetting of a host apparatus.

According to the present invention, when a disk recording/reproducing apparatus is attached/detached in order to perform a reset processing during a recording operation of a signal onto a disk, a host apparatus outputs a command signal for identifying the disk recording/reproducing apparatus. Therefore, it is possible to judge whether or not the attached and detached optical disk recording/reproducing apparatuses are the same, and as a result, a control operation for selecting whether or not to perform a recording resumption operation can be performed.

Moreover, according to the present invention, when the optical disk recording/reproducing apparatus is removed, information on data completely output to the optical disk recording/reproducing apparatus and on remaining data is stored in the host apparatus, and information on data recorded on the disk is stored by the optical disk recording/reproducing apparatus. Therefore, the already performed recording operations are not wasted, even when reset processing is performed.

Furthermore, according to the present invention, upon completion of the reset processing, the remaining data is recorded on the disk continuously after the completely output data based on the information stored in the host apparatus and optical disk recording/reproducing apparatus, and the signal recorded on the disk can be prevented from being wasted.

DETAILED DESCRIPTION OF THE PREFERRED EMBODIMENTS

Figure 1:
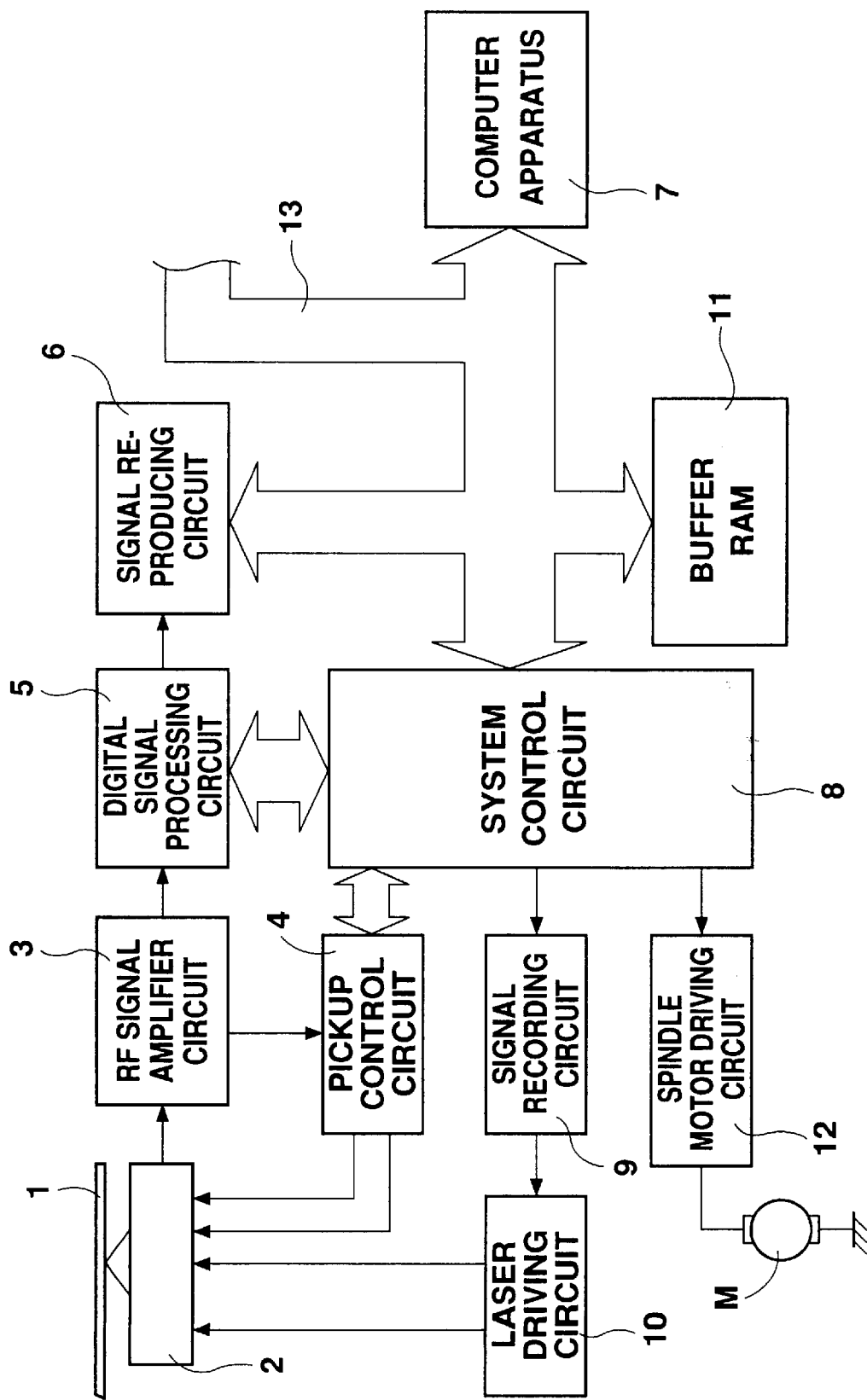
FIG. 1 is a block circuit diagram showing one embodiment of an optical disk recording/reproducing apparatus according to the present invention.

FIG. 1 is a block circuit diagram showing an optical disk recording/reproducing apparatus according to a preferred embodiment of the present invention. In FIG. 1, a reference numeral 1 denotes a disk mounted on a turntable (not shown) which is rotated or driven by a spindle motor M, and is rotated/driven by rotation of the turntable. Moreover, position information data is recorded in a groove called a wobble in the disk 1, and a recording/reproducing operation of a signal is controlled based on a wobble signal obtained from this groove. Numeral 2 denotes an optical pickup including a laser element (not shown) for irradiating the disk 1 with a light beam, a monitoring diode for monitoring a level of the light beam emitted from the laser element, and an optical detector for receiving the light beam reflected from a signal surface of the disk 1. The optical pickup is configured such that it can be moved in a direction diametric to the disk 1 by a pickup driving motor (not shown).

A reference numeral 3 denotes an RF signal amplifier circuit for amplifying an RF signal obtained from the optical detector incorporated in the optical pickup 2 and shaping a waveform. Numeral 4 denotes a pickup control circuit for performing a focusing control operation for focusing the light beam emitted from the optical pickup 2 on the signal surface of the disk 1 based on a signal obtained via the RF signal amplifier circuit 3, and a tracking control operation for causing the light beam to follow a signal track of the signal surface. The pickup control circuit further includes a focus servo circuit and tracking servo circuit.

A reference numeral 5 denotes a digital signal processing circuit for performing digital signal processing of the signal output from the RF signal amplifier circuit 3, and a demodulation operation for each type of signal. Numeral 6 denotes a signal reproducing circuit to which a digital signal obtained by processing the signal in the digital signal processing circuit 5 is input. When information recorded on the disk 1 is an audio signal, the signal reproducing circuit converts the digital signal to an analog signal, and outputs the analog signal to an amplifier. When the information is a data signal such as computer software, the digital signal is output to a computer apparatus 7 disposed as a host apparatus.

A reference numeral 8 denotes a system control circuit to which the signal demodulated by the digital signal processing circuit 5 is input, and which performs various control operations in response to a command signal output from the computer apparatus 7. Numeral 9 denotes a signal recording circuit to which recording signals such as a test signal and information signal are input and which controls a laser emission operation of a laser driving circuit 10 in response to the signal to record signals such as a data signal into the disk 1.

A reference numeral 11 denotes a buffer RAM in which the signal to be recorded on the disk 1 is temporarily stored. The RAM is configured such that the signal output from the computer apparatus 7 is written and a signal storing and reading operation is controlled by a control operation of the system control circuit 8. Moreover, the signal stored in the buffer RAM 11 is stored/held even after the signal is read to be recorded on the disk 1. Thereafter, when a new signal output from the computer apparatus 7 is stored in the corresponding position, the signal data is successively overwritten and deleted. Numeral 12 denotes a spindle motor driving circuit whose operation is controlled by the system control circuit 8. The spindle motor driving circuit rotates, drives, and controls the spindle motor M for rotating/driving the disk 1 at a speed for performing the recording/reproducing operation.

Moreover, the computer apparatus 7 is connected to other optical disk recording/reproducing apparatuses and peripheral apparatuses such as a printer and scanner via a data bus 13. When the optical disk recording/reproducing apparatus is attached or detached during the operation, a reset processing operation is performed.

With this constitution, when the signal is recorded onto the disk 1, the buffer RAM 11 stores the signal output from the computer apparatus 7, the reading operation of the stored signal is controlled, and the recording operation of the signal onto the disk 1 is thereby controlled. Moreover, after the operation for recording the signal onto the disk 1 is interrupted, and when the recording operation is resumed, the signal stored/held in the buffer RAM 11 is compared with the signal recorded on the disk 1 before the interruption. In the above constitution, the signal is recorded in continuation with the signal recorded before the interruption. That is, the signal is recorded in a so-called a seamless system.

Furthermore, while the signal is recorded onto the disk 1, a final address of a position of a normal recording operation is stored in a memory circuit disposed in the system control circuit 8. During the recording operation, the apparatus is brought to a buffer underrun state in which the amount of the recording signal stored in the buffer RAM becomes insufficient, and then the recording operation is interrupted. In such a case, the signal can be recorded in a seamless manner from the interrupted position based on the final address stored in the memory circuit.

The optical disk recording/reproducing apparatus in the present invention is constituted as described above. A reproduction operation in the circuit constituted as described above will next be described. When the computer apparatus 7 outputs a command signal for performing the reproduction operation to the system control circuit 8 constituting a driving apparatus, the system control circuit 8 starts controlling the reproduction operation. In the reproduction operation, a driving current from which a laser output for reading out the signal is obtained is supplied to the laser element incorporated in the optical pickup 2 from the laser driving circuit 10.

When the operation for controlling the reproduction operation starts, the spindle motor driving circuit 12 controls the rotation of the spindle motor M. In the operation for controlling the rotation of the spindle motor, a synchronous signal obtained by decoding a wobble signal is compared with a reference signal output from a reference signal generation circuit (not shown), so that the disk 1 is rotated/driven at the constant linear speed. The control operation is similarly performed also in an operation for recording the signal as described below.

The rotation of the spindle motor is controlled as described above. In the optical pickup 2 for reading out the signal, the focusing and tracking control operation is started, and the optical pickup 2 starts reading the signal from the disk 1. Prior to the reproduction operation, TOC data recorded in a Lead-In region constituting a first section of the disk 1 is read out.

An operation for reading and reproducing the signal recorded in a signal recording region of the first session of the disk 1 is performed based on the TOC data recorded in the read-in region. The signal read out by the optical pickup 2 is passed through the RF signal amplifier circuit 3, and amplified. After the waveform is shaped, the signal is input into the digital signal processing circuit 5, and demodulated. When the digital signal processing circuit 5 processes the signal and extracts information data, the information data is subjected to signal processing such as error correction, and the signal is applied to the signal reproducing circuit 6.

Moreover, when the information data read from the disk 1 is an audio signal, the signal reproducing circuit 6 converts the signal to an analog signal, and outputs the signal to an amplifier. When the information data is a data signal such as computer software, the digital signal is output to the computer apparatus 7.

The reproduction operation in the present embodiment is performed as described above. An operation for recording the signal onto the disk 1 will next be described.

The operation for recording the signal onto the disk 1 includes recording a test signal in a trial writing region disposed in the disk 1 so that a laser output most suitable for properties of the disk 1 can be set. Such a setting operation includes changing the laser output, recording the test signal, and reproducing the recorded signal.

When the laser output is set, information data recorded in a buffer region of the disk 1, that is, position information of the signal recorded in a signal recording region, is read out. Therefore, it is possible to record the data signal in the signal recording region disposed in the disk 1 based on the information data read out as described above. Moreover, a position for performing the recording operation can be recognized.

After completion of such recognition processing operation, the optical pickup 2 is moved to a position in which the recording operation on the disk 1 is to be started, and the recording signal is written into the buffer RAM 11. When the signal is written in the buffer RAM 11, the amount of signal data stored in the buffer RAM 11 gradually increases. When the amount exceeds a predetermined amount, the signal data is read from the buffer RAM 11, and the read signal is input into the signal recording circuit 9. The signal recording circuit 9 then controls the laser driving circuit 10 such that the signal is recorded on the disk 1.

The signal is recorded onto the disk 1 through the aforementioned operation, and the signal is written into the buffer RAM 11 in response to the signal read from the buffer RAM 11. Moreover, while the recording operation is normally performed, an address indicating the position of each recording operation of the signal onto the disk 1, that is, a final address is stored in the memory circuit.

Furthermore, as the signal is recorded onto the disk 1, the amount of signal data output from the computer apparatus 7 and written in the buffer RAM 11 is less than the amount of signal data read out and recorded on the disk 1. Then, the amount of the recording signal stored in the buffer RAM 11 gradually decreases. When the amount of the recording signal stored in the buffer RAM 11 decreases and indicates a predetermined amount (interruption setting value), that is, in the buffer underrun state, a control operation is performed so as to interrupt the recording operation onto the disk 1. When the interruption operation is performed, the operation for reading the signal from the buffer RAM 11 is also interrupted.

When the computer apparatus 7 outputs the recording signal in this state, the control operation for writing the recording signal into the buffer RAM 11 is performed, and the amount of the recording signal data stored in the buffer RAM 11 gradually increases. When the amount of the recording signal stored in the buffer RAM 11 increases and indicates a predetermined amount (resuming setting value), a control operation is performed to resume the recording operation.

Such recording resumption operation includes displacing the optical pickup 2 in a position for starting the recording operation, that is, a position moved backwards from a position in which the recording operation has been interrupted, and performing the reproduction operation from that position. The recording interruption position can easily be recognized from the final address stored in the memory circuit each time the normal recording operation is performed. Additionally, the optical pickup 2 can be moved to a position before the interruption position.

The signal reproduced by the reproduction operation is the signal which was recorded immediately before the interruption of the recording operation. The reproduced signal is compared with the signal stored/held in the buffer RAM 11 and, when both signals are judged to be the same signal in the comparison operation, the signal stored following the signal as an object of the comparison operation in the buffer RAM 11 is read out. Moreover, the signal is input to the signal recording circuit 9 and the recording operation of the signal onto the disk 1 is resumed. The interruption and resumption of the recording of the signal onto the disk 1 can be accomplished by the aforementioned operation. Through the operation, a continuous signal can be recorded onto the disk 1 even after the recording operation has been interrupted. That is, a so-called seamless recording operation can be performed.

The operation for recording the signal in the present embodiment is performed as described above. The present invention will further be described.

The optical disk recording/reproducing apparatus is connected to the computer apparatus 7 via the data bus 13. When the optical disk recording/reproducing apparatus is attached or detached, a reset processing operation is performed based on program stored in a storage device incorporated in the computer apparatus 7. This reset processing operation will not be described because it is a general processing operation performed in the computer apparatus 7.

When the optical disk recording/reproducing apparatus does not record the signal onto the disk 1, the usual reset processing operation is performed. The reset processing operation performed while the recording operation is performed will be described.

When the signal is recorded onto the disk 1 and the optical disk recording/reproducing apparatus is removed from the data bus, this detachment operation is recognized by the computer apparatus 7 and optical disk recording/reproducing apparatus. In this case, the computer apparatus 7 performs a processing operation to store/hold information regarding data which has completely been output to the buffer RAM 11 and data which is not yet output, that is, remaining data, into an internal memory.

Meanwhile, the optical disk recording/reproducing apparatus performs a processing operation to interrupt the recording operation of the signal onto the disk 1 and to store/hold the information on the data recorded on the disk 1 in an internal memory circuit. The processing operation for storing/holding the information on the data recorded on the disk 1 in the memory circuit is the same as the recording interruption operation performed when buffer underrun occurs.

After the processing operation is performed, and the optical disk recording/reproducing apparatus is connected to the data bus 13, the computer apparatus 7 starts the reset processing operation. The reset processing operation includes outputting a command signal for identifying the optical disk recording/reproducing apparatus to the optical disk recording/reproducing apparatus which is attached/detached via the data bus 13. An operation for outputting the command signal for identifying the optical disk recording/reproducing apparatus is an operation normally performed when the computer apparatus 7 is brought to an operation state. Through the recognition operation, the computer apparatus 7 obtains data for identifying the optical disk recording/reproducing apparatus connected via the data bus 13, for example, code data for identifying a product. That is, the optical disk recording/reproducing apparatus returns the code data, and the like to the computer apparatus 7 in response to the command signal. Therefore, when the command signal for identifying the optical disk recording/reproducing apparatus is output with respect to the optical disk recording/reproducing apparatus attached to the data bus 13, the computer apparatus 7 can identify the attached optical disk recording/reproducing apparatus.

When the attached/detached optical disk recording/reproducing apparatus is judged to be the same in the aforementioned recognition operation, a control operation is performed to start an operation for outputting the recording signal into the buffer RAM 11 and a recording resumption operation in the optical disk recording/reproducing apparatus based on the information stored in the computer apparatus 7, that is, the information concerning the data completely output to the buffer RAM 11 and concerning remaining data not yet output from the signals to be recorded. Similarly as in the recording interruption and resuming operation, the recording resumption operation is performed to reproduce the signal recorded on the disk 1 and to record the signal read from the buffer RAM 11 continuously after the reproduced signal.

That is, the computer apparatus 7 starts transmitting the remaining data to the optical disk recording/reproducing apparatus based on the information on the remaining data stored in the internal memory. The optical disk recording/reproducing apparatus stores the supplied data following the stored data in the buffer RAM 11. Additionally, the computer apparatus 7 may communicate with the optical disk recording/reproducing apparatus, and the computer apparatus 7 may confirm data to be transmitted. The data can be confirmed by time information or other information or quality in the data.

On the other hand, the optical disk recording/reproducing apparatus reads out the data before the recording is interrupted, compares the data with the data of the buffer RAM before the interruption, and confirms an interruption point. Moreover, a timing for writing the data after resumption is synchronized with a timing of the read data. Furthermore, after resumption the data is read from the buffer RAM 11, and continuously recorded onto the optical disk in a seamless manner. That is, an operation similar to the operation for resumption after occurrence of buffer underrun is performed.

When the same optical disk recording/reproducing apparatus is attached and detached with respect to the data bus, the remaining data is stored continuous with the data already recorded data on the optical disk.

When the same optical disk recording/reproducing apparatus is attached/detached with respect to the data bus 13, the aforementioned recording resumption operation is performed. However, when the subsequently connected optical disk recording/reproducing apparatus is not the same as the removed optical disk recording/reproducing apparatus, the control operation for resuming the recording operation is not performed. In such a case, as in normal recording operation, a control operation for initialization, that is, a control operation for performing the next recording operation, is performed.

When the signal is recorded onto the disk 1 and the optical disk recording/reproducing apparatus is temporarily detached, the present invention enables reset processing and recording resumption operation to be performed as described above. Also with the present invention, a similar processing operation can be performed when the reset processing operation is performed due to trouble in a peripheral device, such as a printer or the like, connected to the data bus 13.

What is claimed is:

1. A disk recording/reproducing apparatus comprising:
    a buffer which stores data supplied from a host apparatus via a bus; and
    a control circuit which interrupts a recording operation when an amount of a recording signal data in the buffer is not greater than an interruption setting value, and which resumes the recording operation when an amount of the recording signal data in the buffer is not less than a resumption setting value, wherein identification data of the apparatus is transmitted in response to a request command from the host apparatus when the disk recording/reproducing apparatus is disconnected from the host apparatus and then reconnected via the bus.

2. The apparatus according to claim 1 wherein the recording onto the disk is interrupted, and information on the data already completely recorded at this point is stored, when the connection of the host apparatus via the data bus is canceled during the recording of the data onto the disk.

3. The apparatus according to claim 1 wherein data subsequent to the already received data is received from the host apparatus after the identification data of the apparatus is transmitted.

4. The apparatus according to claim 3, wherein the subsequent data is stored in the buffer, and the recording operation is resumed to read the data from the buffer.

5. A disk recording/reproducing system comprising:
    a buffer which stores data supplied from a host apparatus via a bus; and
    a control circuit which, during a recording operation for writing data read from the buffer onto a disk, interrupts the recording operation when an amount of data stored in the buffer is not greater than an interruption setting value, and resumes the recording operation when the amount of data stored in the buffer is not less than a resumption setting value, and
    a host apparatus outputs a command signal for identifying the reconnected disk recording/reproducing apparatus, when the connection of the disk recording/reproducing apparatus via a bus is once canceled and the disk recording/reproducing host apparatus is reconnected during transmission to the data to the disk recording/reproducing apparatus.

6. The system according to claim 5, wherein the host apparatus stores information on the data completely output to the disk recording/reproducing apparatus and remaining data not yet output, when connection of the disk recording/reproducing apparatus via the bus has been canceled.

7. The system according to claim 6, wherein the disk recording/reproducing apparatus stores information regarding the data completely recorded onto the disk and information regarding data not yet recorded, when the connection with the host apparatus via the bus has been canceled.

8. The system according to claim 7, wherein in response to the command signal, the disk recording/reproducing apparatus responds to the host apparatus with identification information of the apparatus.

9. The system according to claim 8, wherein when reconnection of the disconnected disk recording/reproducing apparatus is recognized from the identification information of the disk recording/reproducing apparatus, the host apparatus resumes an operation for transmitting the remaining data to the disk recording/reproducing apparatus based on the stored information.

10. The system according to claim 9, wherein the disk recording/reproducing apparatus stores the data transmitted from the host apparatus in the buffer, reads the data not recorded onto the disk from the buffer, and stores the data continuously already recorded onto the disk.

11. A disk recording/reproducing apparatus comprising:
    a buffer which stores data supplied from a host apparatus via a bus; and
    a control means which interrupts a recording operation when an amount of a recording signal data in the buffer is not greater than an interruption setting value, and which resumes the recording operation when an amount of the recording signal data in the buffer is not less than a resumption setting value,
    wherein identification data of the apparatus is transmitted in response to a request command from the host apparatus when the disk recording/reproducing apparatus is disconnected from the host apparatus and then reconnected via the bus.

12. The apparatus according to claim 11, wherein the recording onto the disk is interrupted, and information on the data already completely recorded at this point is stored, when the connection of the host apparatus via the data bus is canceled during the recording of the data onto the disk.

13. The apparatus according to claim 11, wherein data subsequent to the already received data is received from the host apparatus after the identification data of the apparatus is transmitted.

14. The apparatus according to claim 11, wherein the subsequent data is stored in the buffer, and the recording operation is resumed to read the data from the buffer.

15. A disk recording/reproducing method comprising:

storing data supplied from a host apparatus via a bus;

interrupting, during a recording operation for writing data read from a buffer onto a disk, the recording operation when an amount of data stored in the buffer is not greater than an interruption setting value, and resuming the recording operation when the amount of data stored in the buffer is not less than a resumption setting value; and outputting a command signal for identifying a reconnected disk recording/reproducing apparatus, when the connection of the disk recording/reproducing apparatus via a bus has been canceled once and a disk recording/reproducing host apparatus is reconnected during transmission of the data to the disk recording/reproducing apparatus.

16. The method according to claim 15 further comprising storing information of the data completely output to the disk recording/reproducing apparatus and also storing the remaining data not yet output when connection of the disk recording/reproducing apparatus via the bus has been canceled.

17. The method according to claim 16 further comprising storing information regarding the data completely recorded onto the disk and information regarding data not yet recorded, when the connection with the host apparatus via the bus has been canceled.

18. The method according to claim 17 further comprising responding to the host apparatus with identification information in response to the command signal.

19. The method according to claim 18 further comprising resuming an operation for transmitting the remaining data to the disk recording/reproducing apparatus based on the stored information when reconnection of the disconnected disk recording/reproducing apparatus is recognized from the identification information of the disk recording/reproducing apparatus.

20. The method according to claim 19 further comprising storing the data transmitted from the host apparatus in the buffer, reading the data not recorded onto the disk from the buffer, and storing the data continuously already recorded onto the disk.

* * * * *